July 17, 1962  C. E. ADAMS ET AL  3,044,485
REVERSIBLE FLOW CONTROL VALVE
Original Filed June 18, 1959  2 Sheets-Sheet 2

INVENTORS.
CECIL E. ADAMS
JOSEPH P. CREEK
BY Donald J. Petrich

United States Patent Office 3,044,485
Patented July 17, 1962

3,044,485
REVERSIBLE FLOW CONTROL VALVE
Cecil E. Adams and Joseph P. Creek, Columbus, Ohio, assignors to American Brake Shoe Company, New York, N.Y., a corporation of Delaware
Continuation of application Ser. No. 821,231, June 18, 1959. This application Aug. 2, 1960, Ser. No. 47,347
2 Claims. (Cl. 137—493.7)

This invention relates to hydraulics and more particularly to improvements in reversible flow control valves.

The main object of the invention is to provide improved structure in a valve which functions to control the rate of fluid flow in one direction and permit fluid to flow substantially unrestricted in the opposite direction therethrough.

Another object of the invention is to provide an improved hydraulic surge eliminator including the invention which is capable of permitting fluid to flow in both directions therethrough and in which the flow in one direction is regulated to dampen or prevent pressure surges in the hydraulic line connected to the exhaust port of said valve, and in which the reverse flow of fluid through the valve may be substantially unrestricted.

Another object of the invention is to provide an improvement upon the apparatus disclosed by Cecil E. Adams in his Patent No. 2,690,762 dated October 5, 1954, for "Hydraulic Shock Eliminator."

Further objects and advantages of the invention will be apparent from the following description, reference being had to the accompanying drawings wherein a preferred form of embodiment of the invention is clearly shown.

Figure 1:
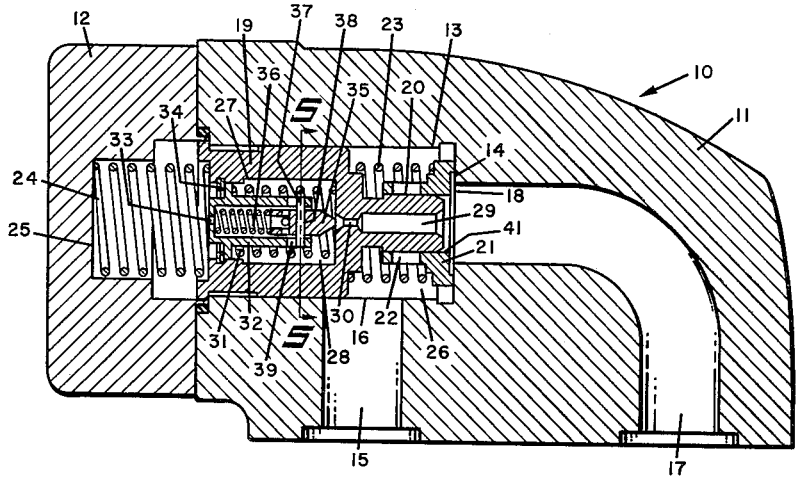
FIG. 1 is a longitudinal sectional view taken through a surge dampening valve which includes the features of the invention, the parts of the valve being shown in the positions they occupy when the valve is inactive.
Figure 2:
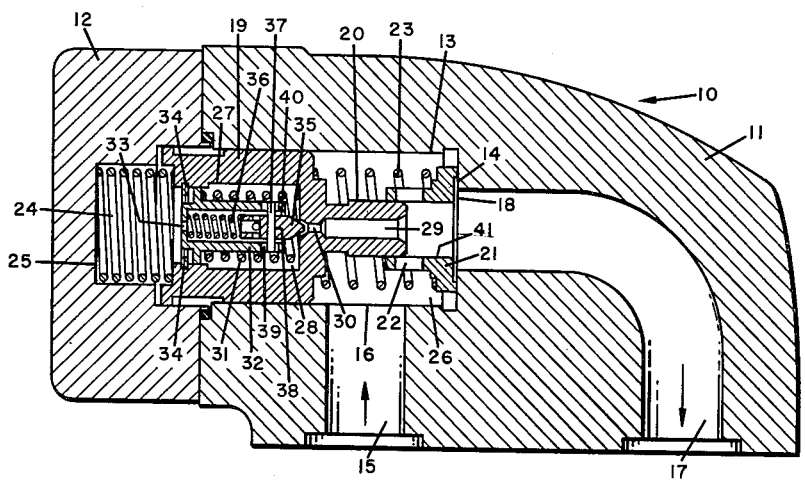
FIG. 2 is a view similar to FIG. 1, the parts of the valve being shown in the positions which they occupy when the valve is operating to prevent a surge in pressure from occurring in the exhaust passageway.

This application is a continuation of our copending application U.S. Serial No. 821,231 filed June 18, 1959, now to be abandoned.

The surge dampening valve seen in the drawings may be employed in a hydraulic system to control pressure surges which may occur in the system due to the sudden introduction of high pressure fluid into a line or other part of the hydraulic system.

It is to be understood that while the invention is illustrated in the drawings as being incorporated in a surge dampening valve, it can also be incorporated in any valve which functions to control the flow of fluid in one direction and permit a substantially unrestricted flow of fluid in a reverse direction therethrough. The invention can be incorporated with facility in surge dampening valves, flow control valves, pressure reducing valves, sequence and other type valves wherein such features are desirable.

Referring to FIGS. 1 through 5 of the drawings, the surge dampening valve 10 has a body 11 and an end cap 12 which is held in sealing engagement with body 11 by cap screws, not shown. Valve body 11 has a stepped bore 13 which forms a valve seat 14 at one end thereof.

Inlet passageway 15 communicates with bore 13 through inlet port 16. The exhaust passageway 17 communicates with bore 13 through exhaust port 18.

The valve means in bore 13 includes a piston 19 having a reduced diameter portion 20, and a combined sleeve and check valve element or unitary sleeve and poppet element 21 having a valve port 22. The valve element 21 is slidingly and sealingly disposed for axial movement upon the reduced diameter portion 20 of piston 19. A spring 23 which abuts piston 19 and valve element 21 urges valve element 21 into sealing abutment with valve seat 14. Piston 19 is normally urged into a closed sealing engagement with valve element 21 by a spring 24 housed in chamber 25 of end cap 12. Piston 19 and valve element 21 cooperate to control the flow of fluid from the inlet passageway 15 to the exhaust passageway 17.

The piston 19 divides the bore 13 into a control chamber 25 and an inlet chamber 26. The function of these chambers will be described later in detail in the description of operation of the surge valve 10.

Piston 19 has a stepped bore 27 with a large diameter portion 28, a small diameter portion 29 and an orifice 30 positioned therebetween. In bore 27 there is a compression spring 31 and a hollow piston 32 with an orifice 33 at one end thereof. Spring 31 and piston 32 are retained in bore 27 by a snap ring 34.

A needle valve 35 and compression spring 36 are retained within the hollow piston 32 by a pin 37 which is pressed into bore 38 in needle valve 35 and extends into slots 39 in the side wall of hollow piston 32 thus forming a lost-motion connector means. Hollow piston 32, needle valve 35 and spring 36 function together and cooperate with orifice 30 in piston 19 to control the flow of fluid from the control chamber 25 to the exhaust passageway 17. The compression spring 31 urges the hollow piston 32 and needle valve 35 to a normally open position, that is, away from orifice 30.

The operation of the surge damping valve is as follows:

Assuming now that fluid under pressure has entered the inlet passageway 15, inlet port 16 and inlet chamber 26 of valve 10, the piston 19 is urged to the left by pressure thus compressing the abutting spring 24 and displacing fluid from control chamber 25 in end cap 12. The fluid in chamber 25 will urge the hollow piston 32 and needle valve 35 to the right thus compressing spring 31. Needle valve 35 will now be restricting the rate of fluid flow from control chamber 25 through orifice 30. Fluid from chamber 25 will flow through orifice 33, spring 36, around needle valve 35 into the large diameter portion 28 of bore 27 and will continue to be metered through orifice 30 into small diameter portion 29, exhaust port 18 and exhaust passageway 17 thus controlling the rate of movement of the piston 19 to the left. (See FIGS. 2 and 5.)

As a result of the controlled movement of piston 19 to the left, the fluid in the control chamber 26 is gradually being metered through valve port 22, into bore 41 of valve element 21, exhaust port 18 and exhaust passageway 17.

Figure 5:
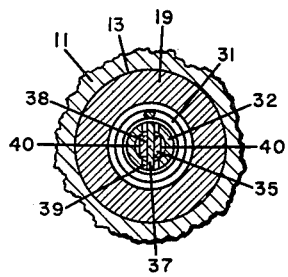
FIG. 5 is a fragmentary view in section, the view taken on line 5—5 of FIG. 1.

It will be seen in FIG. 5 of the drawings that the needle valve 35 has four machined flats 40 which readily permit fluid to flow between the needle valve 35 and the hollow piston 32.

Figure 3:
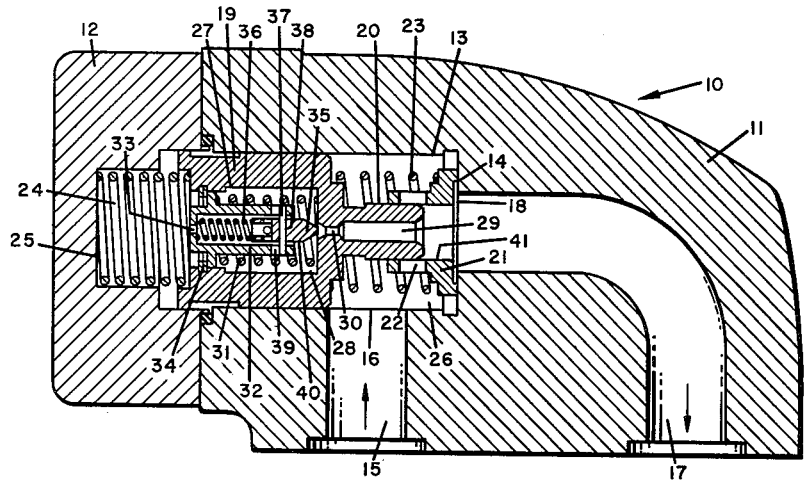
FIG. 3 is a view similar to FIG. 1 but showing the parts of the valve in the positions which they occupy after the valve has operated to prevent a surge in pressure; the parts of the valve are returning to their positions as seen in FIG. 1.

FIG. 3 of the drawings shows the parts of the hydraulic surge eliminator 10 starting to seek their normal positions as seen in FIG. 1 of the drawings after flow is discontinued through the valve in the controlled direction.

Figure 4:
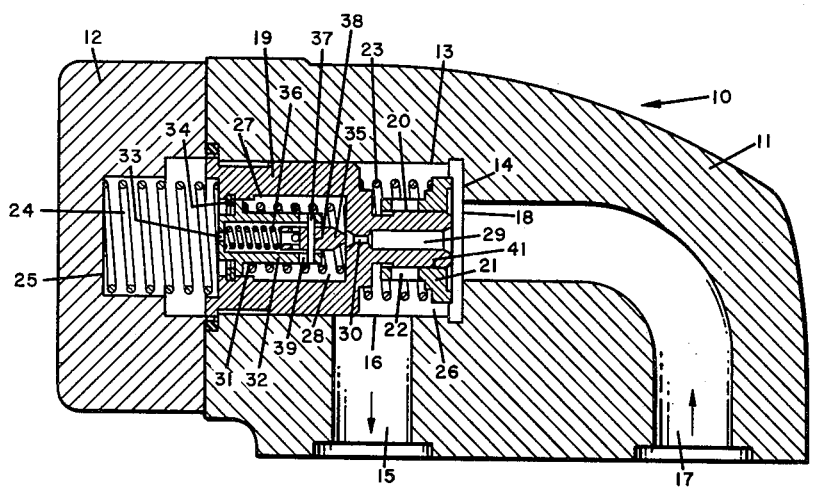
FIG. 4 is also a view similar to FIG. 1 but showing the parts of the valve in the positions which they occupy when fluid is flowing through the valve in a reverse direction.

Referring to FIG. 4 of the drawings, it will be seen that hydraulic fluid is now flowing in a reverse direction through the surge valve 10, as indicated by the arrows. Fluid from the exhaust passageway 17 has urged the unitary sleeve and poppet valve element 21 to the left on the reduced diameter portion 20 of piston valve 19 and is flowing substantially unrestricted through exhaust port 18, chamber 26, inlet port 16 and inlet passageway 15. When there is an interruption in the reverse flow of fluid through surge valve 10, the spring 23 will urge the unitary sleeve and poppet valve element into sealing abutment with the valve seat 14, as seen in FIG. 1 of the drawings.

One of the advantages of the invention is the novel one-piece construction of the unitary sleeve and poppet element which has two functions, first to control fluid flow in one direction and second to permit fluid to flow in a reverse direction through the valve.

Another advantage of the invention lies in the fact that the unitary sleeve and poppet valve element is supported and guided for axial movement by the reduced diameter portion of the piston thus insuring proper alignment of the unitary sleeve and poppet valve element with respect to the reduced diameter portion of the piston and the valve seat.

Another advantage of the invention is the low cost of manufacturing due to the simple and compact structural design of the unitary sleeve and poppet valve element.

While the form of embodiment of the present invention as herein disclosed constitutes a preferred form, it is to be understood that other forms might be adopted, all coming within the scope of the claims which follow.

We claim:

1. A surge damping valve for damping surges in the flow of a fluid in one direction therethrough and for permitting the relatively unrestricted flow of fluid therethrough in a reverse direction, said valve including means forming a body; a bore in said body; a valve seat at one end of said bore and an exhaust passageway communicating with said bore through said valve seat; an inlet port in said bore, a first valve means disposed for axial movement in said bore, said valve means including means forming a cylindrical surface; a second valve means slidably disposed for movement relative to said cylindrical surface and said seat, port means between said first and second valve means cooperating to form a first valve; yieldable means normally positioning said first valve means to close the port means between said first and second valve means thereby preventing the flow of fluid from said inlet port to said exhaust passageway, said first valve means having a stepped through bore which forms an orifice, yieldable valve means disposed for axial movement in said bore, said yieldable valve means including means forming a hollow piston with an orifice at one end and a valve element at the opposite end thereof, said valve element cooperating with said first mentioned orifice and functioning to control the opening of said first valve at a rate inversely proportional to an increase in pressure at said inlet port, resilient means urging said second valve means into abutting relation with said valve seat to form a second valve, said cylindrical surface and said second valve means being in slidable engagement and functioning to control the flow of fluid which enters said inlet port and flows through said exhaust passageway; and said second valve means being movable by pressure at said exhaust passageway to open the latter thereby to permit fluid to flow in a reverse direction from said exhaust passageway to said inlet port.

2. A surge dampening valve having reverse flow features including means forming a body; a bore in said body having a valve seat at one end thereof; an exhaust passageway communicating with said bore through said valve seat; an inlet port in said bore, valve means disposed for axial movement in said bore, said valve means including a piston and a unitary sleeve and poppet valve element, said unitary sleeve and poppet valve element being slidingly and sealingly disposed for axial movement upon said piston; port means in said unitary sleeve and poppet valve element cooperating with said piston to form a first valve, means normally positioning said piston to close said port means in said unitary sleeve and poppet valve element; said piston having a stepped through bore which forms an orifice, yieldable valve means disposed for axial movement in said bore, said yieldable valve means including means forming a hollow piston with an orifice at one end and a valve element at the opposite end thereof, said valve element cooperating with said first mentioned orifice and functioning to control the opening of said first mentioned valve at a rate which is inversely proportional to the magnitude of the fluid pressure surges that occur in said inlet port, resilient means urging said unitary sleeve and poppet valve element into sealing abutment with said valve seat to form a second valve, said piston and said unitary sleeve and poppet valve element sliding thereon and functioning to control the flow of fluid which enters said inlet port and flows through said exhaust passageway; and said unitary sleeve and poppet valve element being movable by pressure at said exhaust passageway to open the latter thereby to permit fluid to flow in a reverse direction from said exhaust passageway to said inlet port.

References Cited in the file of this patent
UNITED STATES PATENTS

| | | |
|---|---|---|
| 2,690,762 | Adams | Oct. 5, 1954 |
| 2,718,285 | Largay | Sept. 20, 1955 |
| 2,914,078 | McGowen | Nov. 24, 1959 |